(12) United States Patent
Bauman

(10) Patent No.: US 12,471,581 B2
(45) Date of Patent: Nov. 18, 2025

(54) COLLAPSIBLE NET APPARATUS

(71) Applicant: Colter Backcountry, LLC, Mesa, AZ (US)

(72) Inventor: Patrick Bauman, Mesa, AZ (US)

( * ) Notice: Subject to any disclaimer, the term of this patent is extended or adjusted under 35 U.S.C. 154(b) by 99 days.

(21) Appl. No.: 18/504,152

(22) Filed: Nov. 7, 2023

(65) Prior Publication Data
US 2024/0147973 A1    May 9, 2024

Related U.S. Application Data

(60) Provisional application No. 63/516,189, filed on Jul. 28, 2023, provisional application No. 63/423,117, filed on Nov. 7, 2022.

(51) Int. Cl.
*A01K 77/00*    (2006.01)

(52) U.S. Cl.
CPC .................. *A01K 77/005* (2022.02)

(58) Field of Classification Search
CPC ..... A01K 77/00; A01K 77/005; A01M 3/002; E04H 4/1609; A63B 59/20
See application file for complete search history.

(56) References Cited

U.S. PATENT DOCUMENTS

| | | | | |
|---|---|---|---|---|
| 2,486,163 A * | 10/1949 | Jennings | ........... | A01K 77/00 43/11 |
| 3,670,444 A * | 6/1972 | Dieterich | ........... | A01K 77/00 43/12 |
| 4,706,404 A * | 11/1987 | Kun | ........... | A01K 77/00 43/12 |
| 4,870,773 A * | 10/1989 | Schmucker | ........... | A01K 77/00 43/12 |
| 5,276,989 A * | 1/1994 | Lumb | ........... | A01K 77/00 210/470 |
| 5,339,556 A * | 8/1994 | Boehm | ........... | A01K 77/00 43/11 |
| 5,342,513 A * | 8/1994 | Wall | ........... | E04H 4/1609 7/106 |
| 5,941,011 A * | 8/1999 | Baker | ........... | F16C 11/04 16/366 |
| 6,655,072 B2 * | 12/2003 | Blaschke | ........... | A01K 77/00 43/26.1 |
| 8,261,482 B1 * | 9/2012 | Buchanan | ........... | A01K 77/00 206/234 |

FOREIGN PATENT DOCUMENTS

| | | | |
|---|---|---|---|
| KR | 20130117087 A * | 10/2013 | |
| SE | 2430088 A1 * | 2/2025 | |
| WO | WO-9500013 A1 * | 1/1995 | ............. A01K 77/00 |

* cited by examiner

*Primary Examiner* — Magdalena Topolski
(74) *Attorney, Agent, or Firm* — Intellectual Strategies

(57) ABSTRACT

A collapsible fishing net apparatus includes a handle including a grip portion, and a rim piece that is configured to couple and decouple from the handle. When the rim piece is coupled to the handle, the rim piece and handle together form a continuous loop. The apparatus further includes a net that is configured to couple to both the handle and the rim piece and enclose the continuous loop.

11 Claims, 18 Drawing Sheets

COLLAPSIBLE NET APPARATUS

CROSS-REFERENCE TO RELATED APPLICATIONS

This application claims the benefit of U.S. Provisional Application No. 63/423,117, filed on Nov. 7, 2022, which is incorporated by reference herein in its entirety. This application claims the benefit of U.S. Provisional Application No. 63/516,189, filed on Jul. 28, 2023, which is incorporated by reference herein in its entirety.

FIELD

This disclosure relates generally to a fly-fishing net apparatus. More specifically, this disclosure relates generally to a collapsible or packable fly-fishing net apparatus.

BACKGROUND

The subject matter of the present application has been developed in response to the present state of the art, and in particular, in response to the problems and disadvantages associated with conventional devices that have not yet been fully solved by currently available techniques. Accordingly, the subject matter of the present application has been developed to provide embodiments of a system, apparatus, and method that overcome at least some of the shortcomings of prior art techniques.

When fly-fishing, anglers typically need a net to effectively land fish. Currently, there are a variety of nets on the market. These range from cheaper wood and plastic nets with nylon baskets to high-end carbon fiber frames with silicone baskets. The problem is that the nets currently on the market are very large. Fly fishermen who fish in the backcountry and go on multi-day trips have a difficult, if not impossible, time bringing along a traditional net. It may be too big or bulky to easily fit in a backpack or to carry on a multi-day trip.

Disclosed herein is an apparatus. The apparatus includes a fly-fishing net that is configured to be dismantled and reassembled when needed. In the dismantled condition, the apparatus is easily carried or fits easily into a container or bag for ease with backpacking. In many embodiments, the fly-fishing net apparatus includes a frame and a net. The net may be removed from the frame or attached to the frame as needed. In addition, in some embodiments, the frame is made of component parts that allows the frame to be dismantled and reassembled as needed.

SUMMARY

Disclosed herein is a collapsible fishing net apparatus. The collapsible fishing net apparatus includes a handle including a grip portion, and a rim piece that is configured to couple and decouple from the handle. When the rim piece is coupled to the handle, the rim piece and handle together form a continuous loop. The apparatus further includes a net that is configured to couple to both the handle and the rim piece and enclose the continuous loop. The preceding subject matter of this paragraph characterizes example 1 of the present disclosure.

The rim piece includes at least one first hinge that can be folded when the rim piece is decoupled from the handle. The preceding subject matter of this paragraph characterizes example 2 of the present disclosure, wherein example 2 also includes the subject matter according to example 1, above.

The rim piece includes a second hinge that can be folded when the rim piece is decoupled from the handle. The preceding subject matter of this paragraph characterizes example 3 of the present disclosure, wherein example 3 also includes the subject matter according to any one of examples 1-2, above.

The rim piece includes a generally oval shape when the rim piece is in an expanded configuration, wherein the expanded configuration includes that the first and second hinges are not folded. The preceding subject matter of this paragraph characterizes example 4 of the present disclosure, wherein example 4 also includes the subject matter according to any one of examples 1-3, above.

The rim piece includes connectors at each end of the rim piece, wherein the connectors are configured to couple to the handle. The preceding subject matter of this paragraph characterizes example 5 of the present disclosure, wherein example 5 also includes the subject matter according to any one of examples 1-4, above.

The connectors are female connectors. The preceding subject matter of this paragraph characterizes example 6 of the present disclosure, wherein example 6 also includes the subject matter according to any one of examples 1-5, above.

The handle includes male connectors, and wherein the male connectors couple to the female connectors of the rim piece. The preceding subject matter of this paragraph characterizes example 7 of the present disclosure, wherein example 7 also includes the subject matter according to any one of examples 1-6, above.

The net includes a cable that is interwoven into the rim piece and secures the net to the rim piece. The preceding subject matter of this paragraph characterizes example 8 of the present disclosure, wherein example 8 also includes the subject matter according to any one of examples 1-7, above.

The cable is configured to couple to the handle. The preceding subject matter of this paragraph characterizes example 9 of the present disclosure, wherein example 9 also includes the subject matter according to any one of examples 1-8, above.

The handle includes a recessed notch on the grip portion and wherein the cable is configured to couple to the handle within the recessed notch. The preceding subject matter of this paragraph characterizes example 10 of the present disclosure, wherein example 10 also includes the subject matter according to any one of examples 1-9, above.

The rim piece further includes a plurality of apertures. The preceding subject matter of this paragraph characterizes example 11 of the present disclosure, wherein example 11 also includes the subject matter according to any one of examples 1-10, above.

The rim piece when in a collapsed condition folds and a first end of the rim piece folds to near the second hinge. The preceding subject matter of this paragraph characterizes example 12 of the present disclosure, wherein example 12 also includes the subject matter according to any one of examples 1-11, above.

The rim piece when in a collapsed condition folds and a second end of the rim piece folds to near the first hinge. The preceding subject matter of this paragraph characterizes example 13 of the present disclosure, wherein example 13 also includes the subject matter according to any one of examples 1-12, above.

The rim piece includes three decouplable parts, a first rim piece, a second rim piece, and a cap piece. The preceding subject matter of this paragraph characterizes example 14 of the present disclosure, wherein example 14 also includes the subject matter according to any one of examples 1-13, above.

The first rim piece and the second rim piece are configured to couple to the handle, and wherein the cap piece is configured to couple to the first rim piece and the second rim piece. The preceding subject matter of this paragraph characterizes example 15 of the present disclosure, wherein example 15 also includes the subject matter according to any one of examples 1-14, above.

Disclosed herein is a collapsible fishing net apparatus. The apparatus includes a handle including a grip portion, and a rim piece coupled to the handle, and wherein the rim piece is configured to completely decouple from the handle to form two separate pieces of the apparatus, and wherein when rim piece is coupled to the handle, the rim piece and handle together form a continuous loop. The apparatus includes a net that is configured to couple to both the handle and the rim piece and enclose the continuous loop. The preceding subject matter of this paragraph characterizes example 16 of the present disclosure.

The rim piece includes a first hinge and a second hinge that can be folded when the rim piece is decoupled from the handle. The preceding subject matter of this paragraph characterizes example 17 of the present disclosure, wherein example 17 also includes the subject matter according to example 16, above.

The rim piece includes connectors at each end of the rim piece, wherein the connectors are configured to couple to the handle. The preceding subject matter of this paragraph characterizes example 18 of the present disclosure, wherein example 18 also includes the subject matter according to any one of examples 16-17, above.

The net includes a cable that is interwoven into the rim piece and secures the net to the rim piece. The preceding subject matter of this paragraph characterizes example 19 of the present disclosure, wherein example 19 also includes the subject matter according to any one of examples 16-18, above.

The handle includes a recessed notch on the grip portion and wherein the cable is configured to couple to the handle within the recessed notch. The preceding subject matter of this paragraph characterizes example 20 of the present disclosure, wherein example 20 also includes the subject matter according to any one of examples 16-19, above.

Other aspects and advantages of embodiments of the present invention will become apparent from the following detailed description, taken in conjunction with the accompanying drawings, illustrated by way of example of the principles of the invention.

BRIEF DESCRIPTION OF DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered limiting of its scope, the subject matter will be described and explained with additional specificity and detail through the use of the drawings.

Throughout the description, similar reference numbers may be used to identify similar elements. The following list is an example of the reference numbers used in the accompanying drawings.

DETAILED DESCRIPTION

Figure 1:
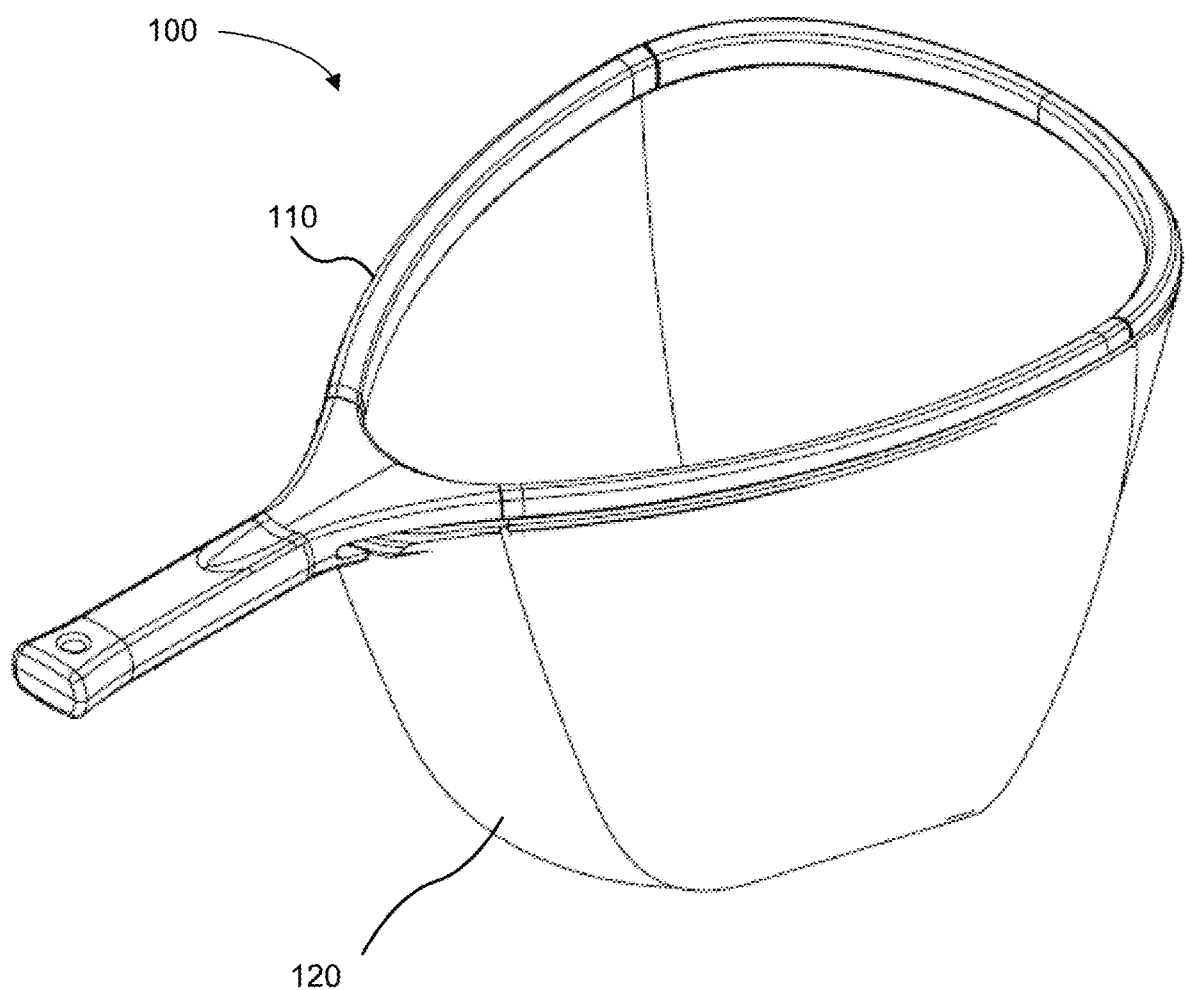
FIG. 1 depicts a perspective view of a fly-fishing net apparatus in a fully assembled state, according to one or more embodiments of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

The expression "configured to" as used herein may be used interchangeably with "suitable for," "having the capacity to," "designed to," "adapted to," "made to," or "capable of" according to a context. The term "configured" does not necessarily mean "specifically designed to" at a hardware level. Instead, the expression "apparatus configured to . . . " may mean that the apparatus is "capable of . . . " along with other devices or parts in a certain context.

While many embodiments are described herein, at least some of the described embodiments describe an apparatus. The apparatus includes a fly-fishing net that is configured to be dismantled and reassembled when needed. In the dismantled condition, the apparatus is easily carried or fits easily into a container or bag for ease with backpacking. In many embodiments, the fly-fishing net apparatus includes a frame and a net. The net may be removed from the frame or attached to the frame as needed. In addition, in some embodiments, the frame is made of component parts that allows the frame to be dismantled and reassembled as needed. Component parts that are easily dismantled and reassembled into a sturdy apparatus is a great benefit for fisherman that have little room to spare as they hike to a favored destination.

Referring now to FIG. 1, the Figure depicts a perspective view of a fly-fishing net apparatus 100 in a fully assembled state, according to one or more embodiments of the invention. Although the fly-fishing net apparatus 100 is shown and described with certain components and functionality, other embodiments of the fly-fishing net apparatus 100 may include fewer or more components to implement less or more functionality.

FIG. 1 depicts a fly-fishing net apparatus 100 including a frame 110 and a net 120. The frame may be a rigid structure that includes primarily a handle configured for gripping the frame and a closed-looped rim that is configured to form an opening. The net is configured to attach to the closed-looped rim. As can be seen, the fly-fishing net apparatus 100 may be used to gather or scoop large fish once they have been caught by a fisherman. Although the fly-fishing net apparatus 100 is referred to here in relation to fly fishing, it is noted that the fly-fishing net apparatus 100 may be used for any type of fishing and not exclusively for fly fishing. The frame 110 may be constructed of a strong and rigid material to support the net when the net is weighted down by fish. The frame 100 may include a handle that is ergonomically friendly to hold and maneuver the fly-fishing net apparatus 100.

Figure 2:
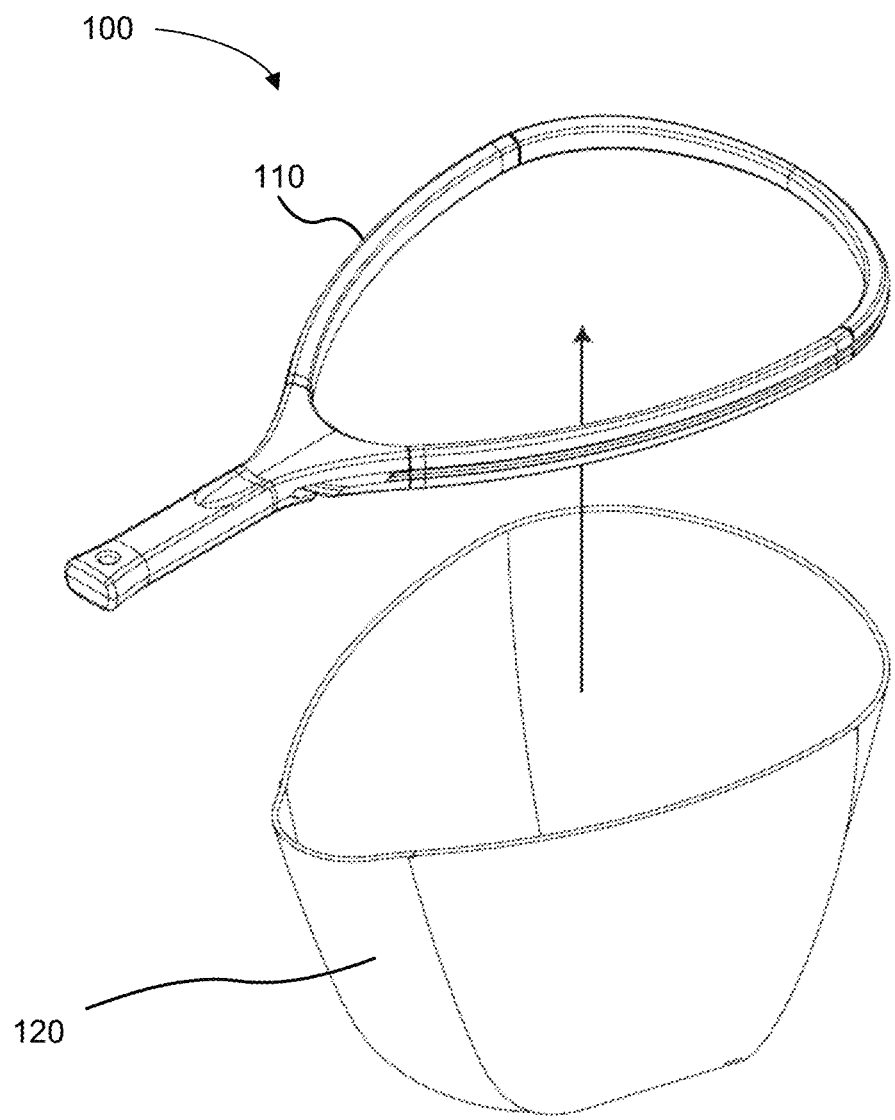
FIG. 2 depicts a perspective view of a fly-fishing net apparatus with the frame in a fully assembled state and the net detached, according to one or more embodiments of the invention.

Referring now to FIG. 2, the Figure depicts a perspective view of a fly-fishing net apparatus 100 with the frame in a fully assembled state and the net detached, according to one or more embodiments of the invention. Although the fly-fishing net apparatus 100 is shown and described with certain components and functionality, other embodiments of the fly-fishing net apparatus 100 may include fewer or more components to implement less or more functionality.

FIG. 2 depicts a fly-fishing net apparatus 100 including a frame 110 and a net 120 with the net 120 and frame 110 in a disassembled or dismantled state. The fly-fishing net apparatus 100 is configured to be easily disassembled to make it easier to transport the fly-fishing net apparatus 100. The frame may be a rigid structure that includes primarily a handle configured for gripping the frame and a closed-looped rim that is configured to form an opening. The net is configured to easily attach to the closed-looped rim and detach from the closed-looped rim.

The frame 110 may be constructed of a strong and rigid material to support the net when the net is weighted down by fish. The frame 100 may include a handle that is ergonomically friendly to hold and maneuver the fly-fishing net apparatus 100. In some embodiments, the frame 110 incudes a securing mechanism that is configured to secure the net 120 to the from 110. The securing mechanism may allow for the easy removal of the net when needed.

Figure 3:
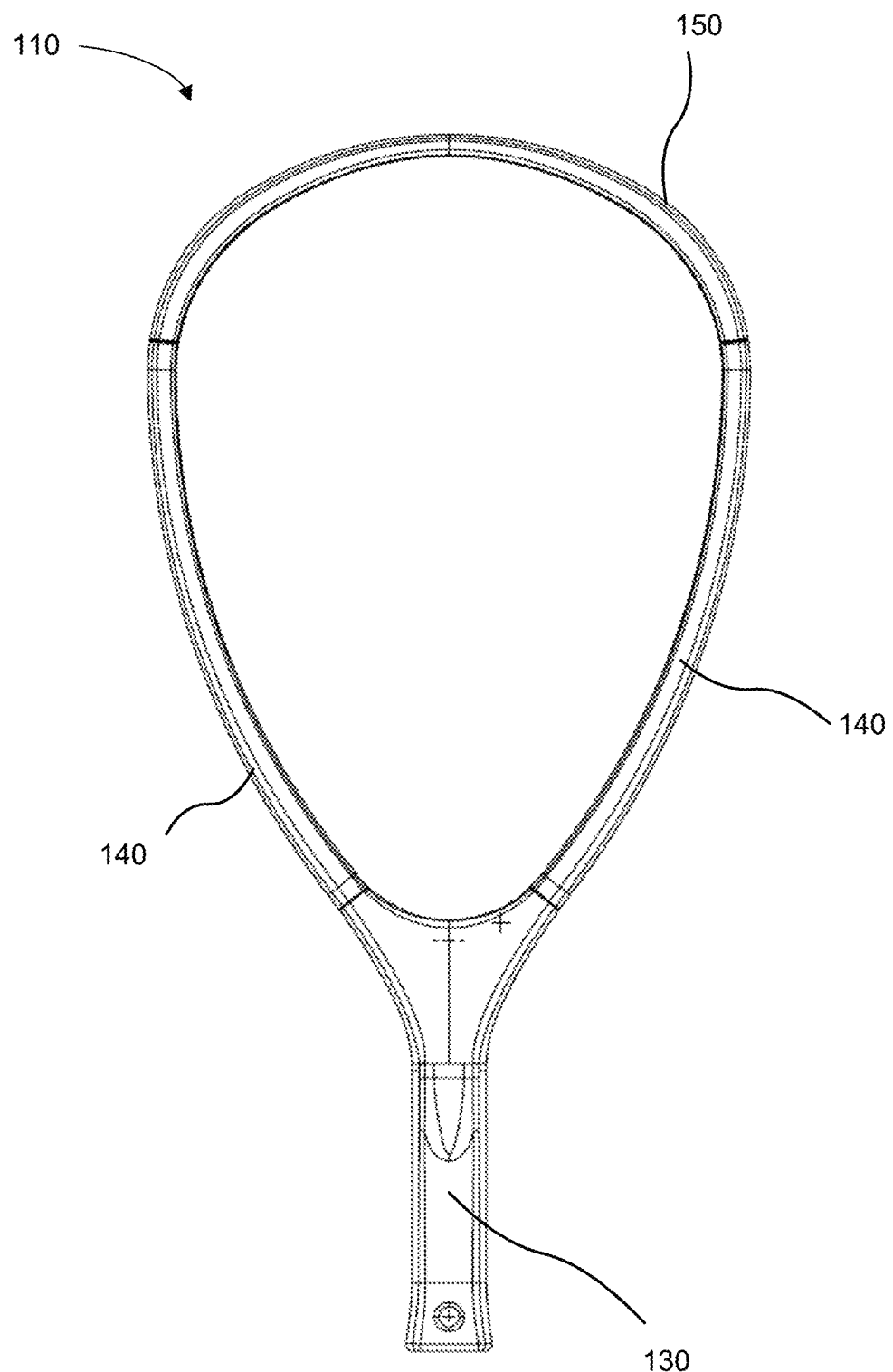
FIG. 3 depicts a front view of the frame of a fly-fishing net apparatus with the frame in a fully assembled state, according to one or more embodiments of the invention.

Referring now to FIG. 3, the Figure depicts a front view of the frame 110 of a fly-fishing net apparatus with the frame 100 in a fully assembled state, according to one or more embodiments of the invention. Although the frame 110 is shown and described with certain components and functionality, other embodiments of the frame 110 may include fewer or more components to implement less or more functionality.

FIG. 3 depicts a frame 110 including various sub-components that are configured to be assembled and disassembled as needed. Some embodiments include a fully formed frame while other embodiments include a frame 110 that can be broken down into disassembled sub-pieces. The location of where the sub-pieces meet and connect may vary with different embodiments. Described herein is an embodiment of a frame with four sub-components. Other embodiments may include two sub-components, three sub-components, five sub-components, or more. The illustrated embodiment is disclosed and described for illustrative purposes.

The frame 110 includes four sub-components including a handle 130, two side pieces 140, and a cap piece 150. The four sub-components, including the handle 130, the two side pieces 140, and the cap piece 150, form the closed-loop rim of the frame 110.

Figure 4:
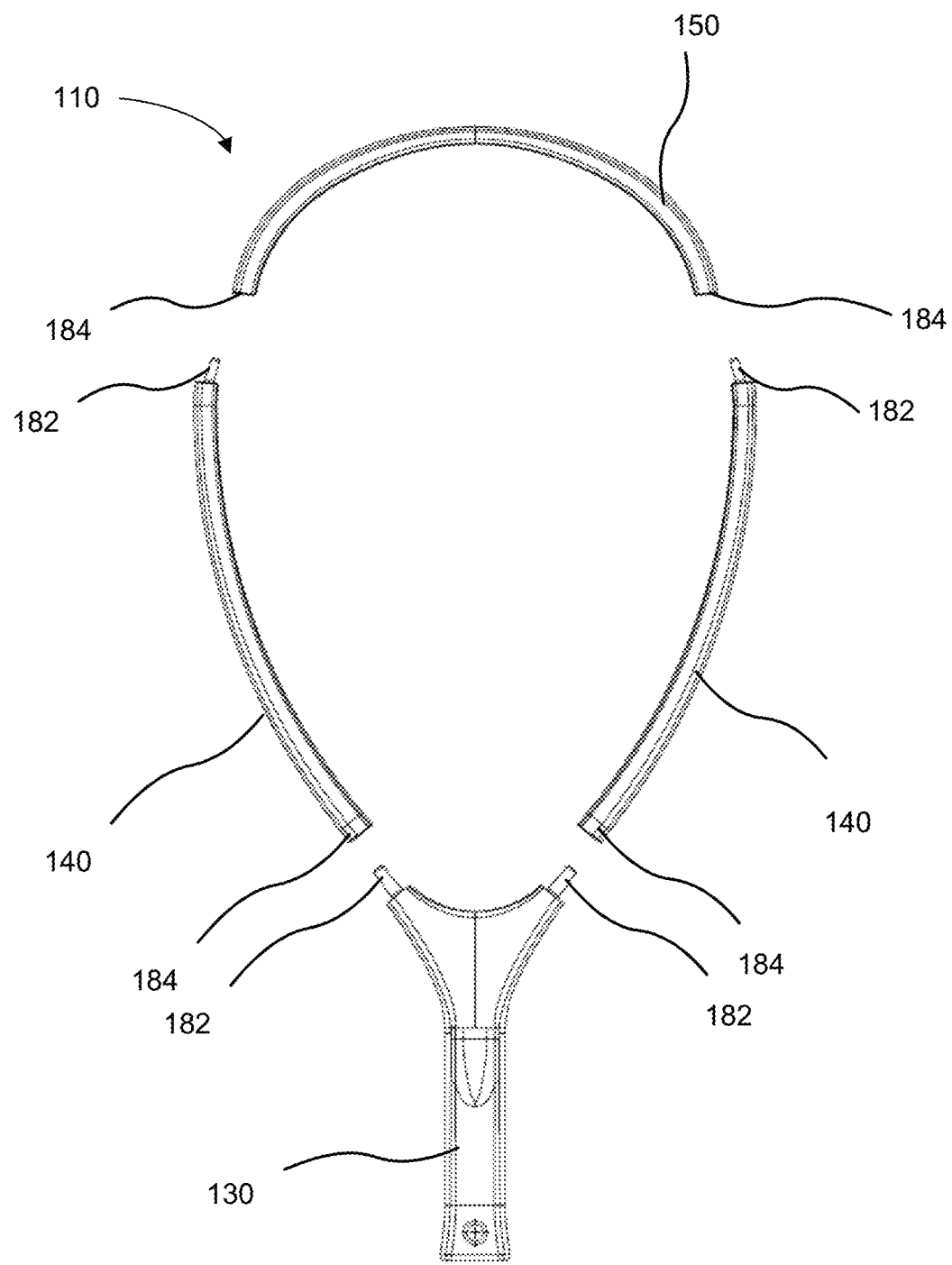
FIG. 4 depicts a front view of the frame of a fly-fishing net apparatus with the frame in a disassembled state, according to one or more embodiments of the invention.

As illustrated, the two side pieces 140 connect and couple to each side of the handle 130 (the various sub-components may be more easily seen in FIG. 4). Attached to each side piece 140 is the cap piece 150 that connects and forms the closed loop.

Although not easily seen in the figures, each sub-component includes a lip or retention crevice. The lip or retention crevice is configured to hold the net (not shown) in place and may form an interference fit once a securing mechanism is deployed.

Referring now to FIG. 4, the Figure depicts a front view of the frame 110 of a fly-fishing net apparatus with the frame in a disassembled state, according to one or more embodiments of the invention. Although the frame 110 is shown and described with certain components and functionality, other embodiments of the frame 110 may include fewer or more components to implement less or more functionality.

FIG. 4 depicts each of the sub-components of the frame 110 separately. The frame 110 includes the handle 130 which includes a handle grip as well as the base portion of the rim. Also depicted are an embodiment of the connectors of the sub-component. The particular connectors described and depicted are for illustrative purposes and other types of connectors or connections are contemplated within this disclosure.

Referring to FIG. 4, the handle 130 includes two male connectors 182 which are effectively pegs that can be inserted into other sub-components. As can be seen, the male connectors 182 of the handle 130 may be inserted into female connectors 184 of the side pieces 140. The male connectors 182 and the female connectors 184 are configured to align the sub-components and couple the sub-components together. This may be accomplished through an interference fit or other mechanical means to secure the components together. Variations on this concept are contemplated herein and are not listed only for the sake of brevity.

The two side pieces 140 are generally curved pieces that form roughly the sides of the closed-loop rim. They are configured to extend from the handle away from each other circling back towards each other. At the opposite end of the side pieces 140 from the female connectors 184, the side pieces 140 include male connectors 182 similar to those found on the handle 130

The cap piece 150 is configured to couple to both of the side pieces 140 at the end opposite from the handle 130. The cap piece 150 includes two female connectors 184 similar to the female connectors of the side pieces 140. The female connectors 184 are configured to couple to and align with the male connectors 182 of the side pieces 140 in much the same way as was described earlier with the connection between the side pieces and the handle. This may be accomplished through an interference fit or other mechanical means to secure the components together. Variations on this concept are contemplated herein and are not listed only for the sake of brevity.

In some embodiments, the male and female connectors may be reversed or found in another combination. As an example, the cap piece 150 may include two male connectors 182 which are configured to couple to two female connectors 184 on the side pieces. Additionally, the side pieces may have male connectors 182 that couple to female connectors 184 on the handle. As another alternative, the male connectors 182 may all go in a clock-wise direction around the rim such that the handle 130 and the cap piece 150 may each have one male connector and one female connector.

Figure 5:
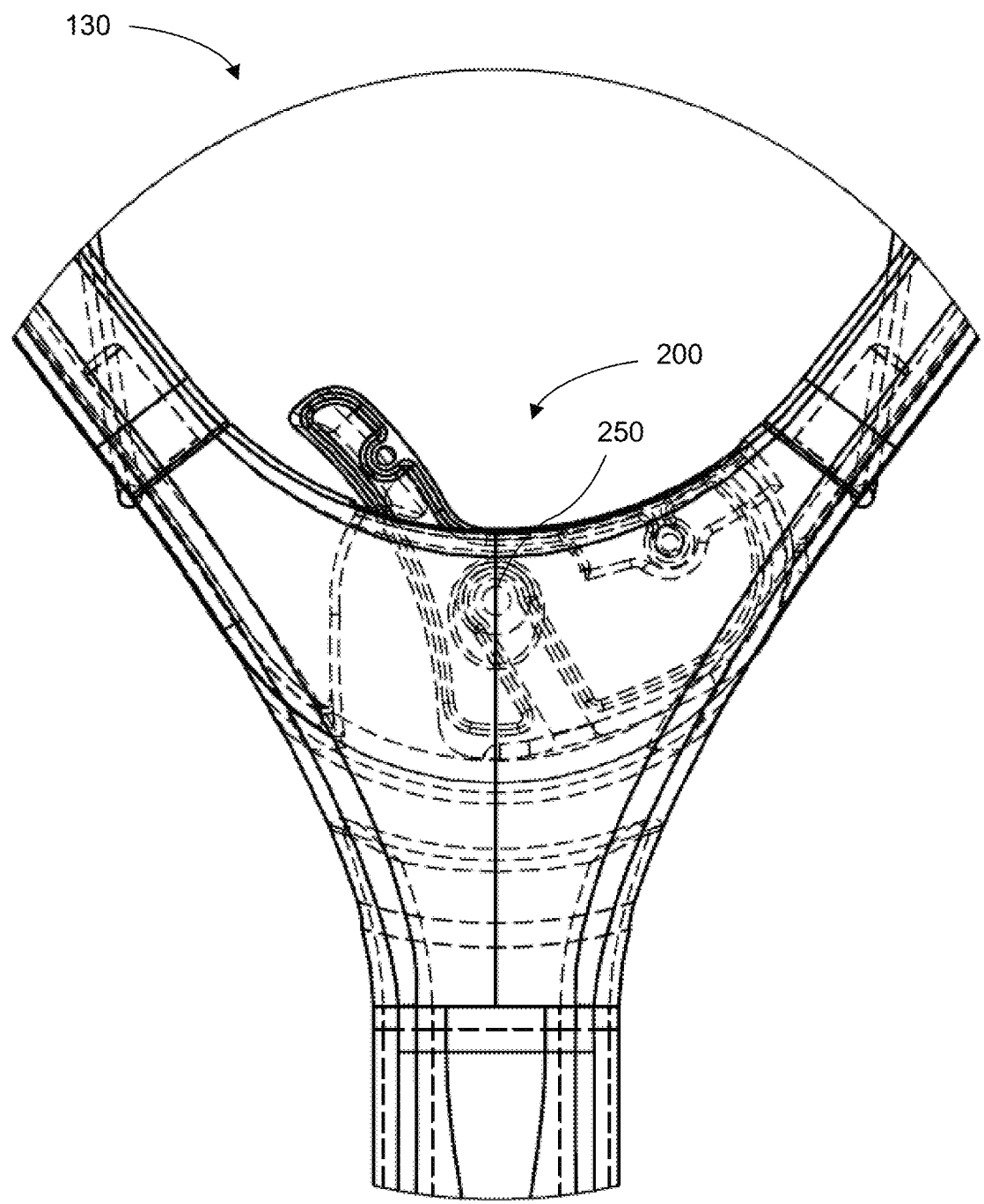
FIG. 5 depicts a close-up view of the securing mechanism of the frame of the fly-fishing net apparatus with the securing mechanism in an open state, according to one or more embodiments of the invention.

Referring now to FIG. 5, the Figure depicts a close-up view of the securing mechanism of the frame of the fly-fishing net apparatus with the securing mechanism in an open state, according to one or more embodiments of the invention. Although the securing mechanism is shown and described with certain components and functionality, other embodiments of the securing mechanism may include fewer or more components to implement less or more functionality.

The securing mechanism, in the illustrated embodiment, is a rotating cam. The securing mechanism is shown in an open position. In the open position, the net 120 can be placed around the rim of the frame and positioned in a slot that is accessible. Once the net 120 is in position, the cam may be rotated into a closed position. The closed position of the cam is configured to first pull the net tight around the rim of the frame and second be secured behind the cam so that the net stays coupled and secured to the frame. This particular securing mechanism is shown and described for illustrative purposes. Other embodiments may include different or alternative securing mechanisms.

In addition, the location of the securing mechanism is shown on the handle 130. In other embodiments, the securing mechanism may be located on other sub-components or in other locations along the rim of the frame.

Figure 6:
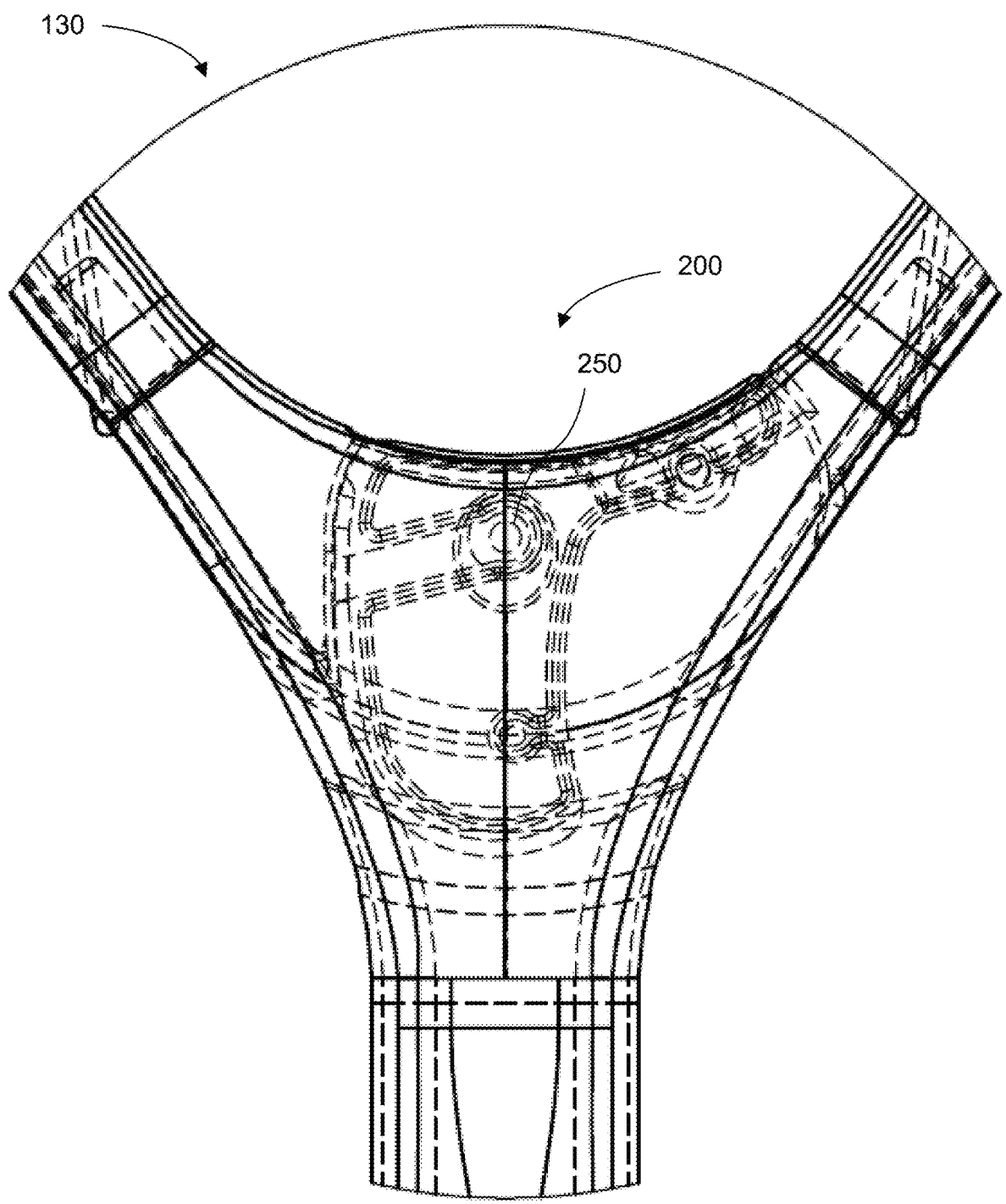
FIG. 6 depicts a close-up view of the securing mechanism of the frame of the fly-fishing net apparatus with the securing mechanism in a closed state, according to one or more embodiments of the invention.

Referring now to FIG. 6, the Figure depicts a close-up view of the securing mechanism of the frame of the fly-fishing net apparatus with the securing mechanism in a closed state or closed position, according to one or more embodiments of the invention. Although the securing mechanism is shown and described with certain components and functionality, other embodiments of the securing mechanism may include fewer or more components to implement less or more functionality.

FIG. 6 depicts a close-up view of the securing mechanism of the frame of the fly-fishing net apparatus with the securing mechanism in an open state or open position with the cam on the opposite side (shown in dashed lines). As was described above, the cam has now been rotated to an open position and the open position is configured to allow the net to be positioned before the cam is rotated and closed to secure the net. The cam includes a cam hinge 250 about which the securing mechanism 200 may be rotated. Once rotated, the securing mechanism will first pull the net tight around the rim of the frame and second be secured behind the cam so that the net stays coupled and secured to the frame.

Figure 7:
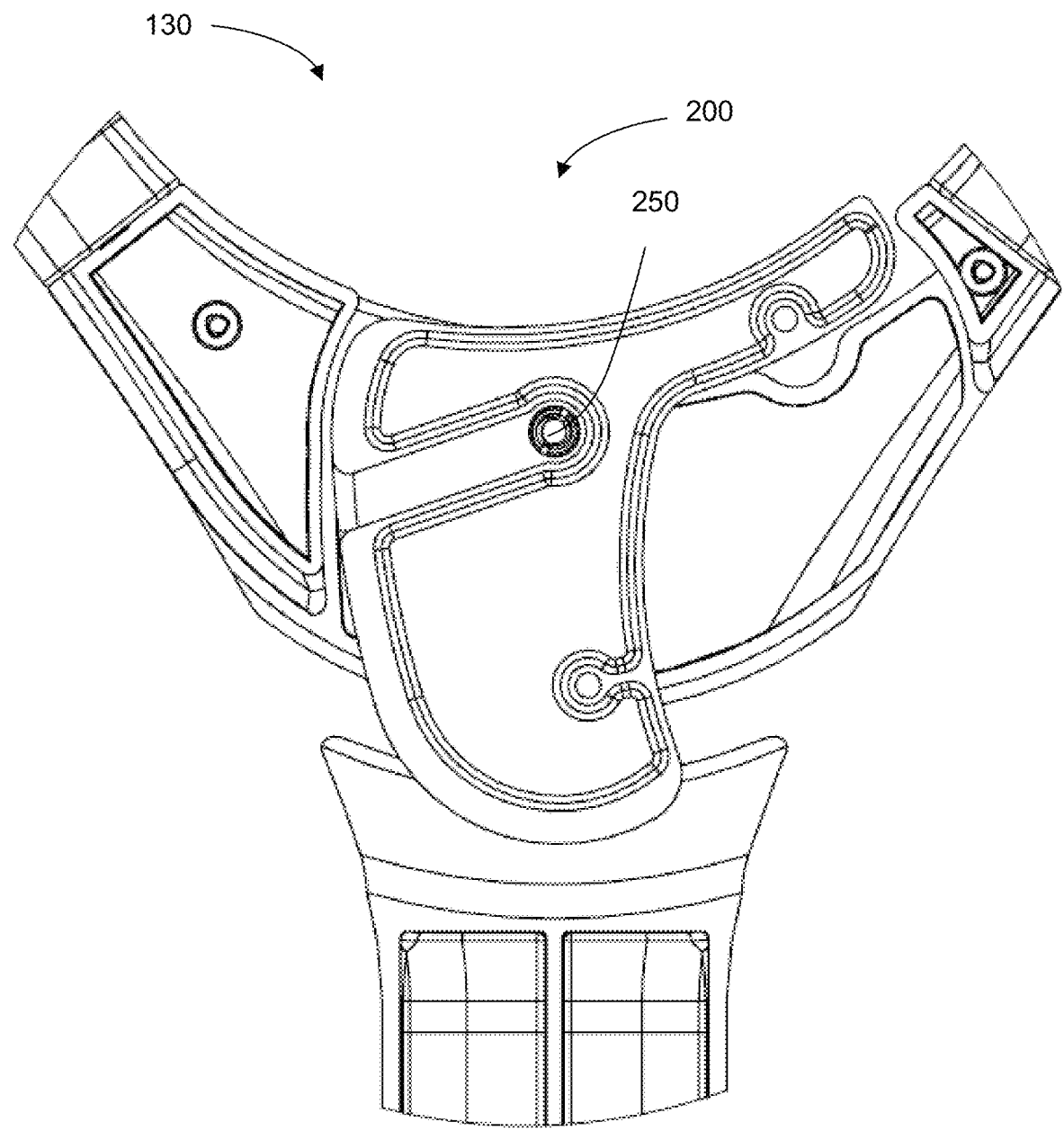
FIG. 7 depicts a close-up view of the securing mechanism of the frame of the fly-fishing net apparatus with the securing mechanism in a closed state, according to one or more embodiments of the invention.

Referring now to FIG. 7, the Figure depicts a close-up view of the securing mechanism of the frame of the fly-fishing net apparatus with the securing mechanism in a closed state or closed position with the cam on the opposite side (shown in dashed lines). As was described above, the cam has now been rotated to a closed position and the closed position is configured to first pull the net tight around the rim of the frame and second be secured behind the cam so that the net stays coupled and secured to the frame.

Referring now to FIGS. 8 thru 23, the Figures depicts generally an apparatus 100 or components of the apparatus in a somewhat consistent matter according to one or more embodiments of the invention. Small differences may be noted in each Figure and are not meant to limit other embodiments of the invention. Although the apparatus 100 is shown and described with certain components and functionality, other embodiments of the apparatus 100 may include fewer or more components to implement less or more functionality.

Figure 9:
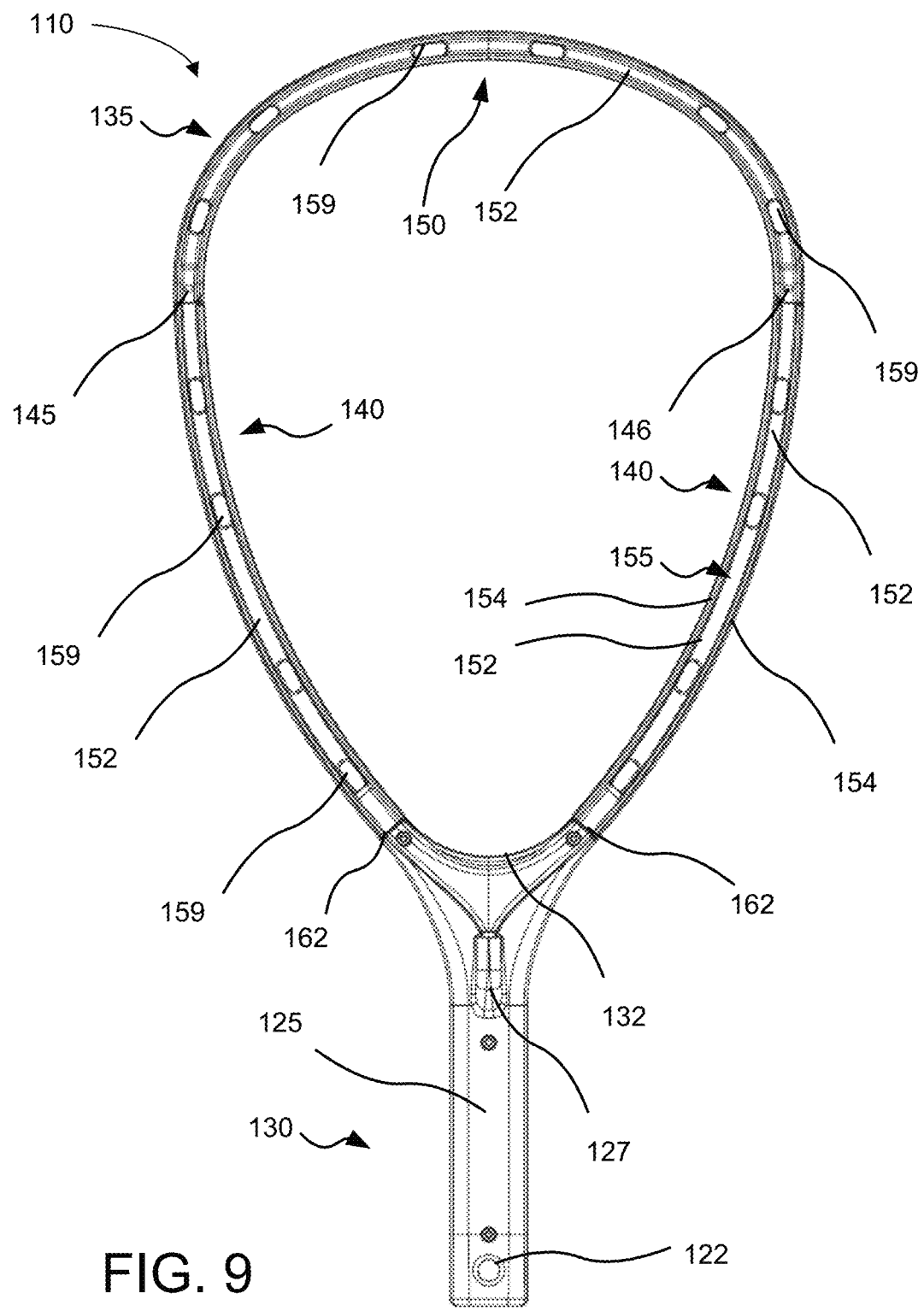
FIG. 9 depicts a front view of a frame in an assembled or coupled state, according to one or more embodiments of the invention.

Referring now to FIG. 9, a front view of a frame 110 is depicted. Although the frame 110 is shown and described with certain components and functionality, other embodiments of the frame 110 may include fewer or more components to implement less or more functionality.

Figure 12:
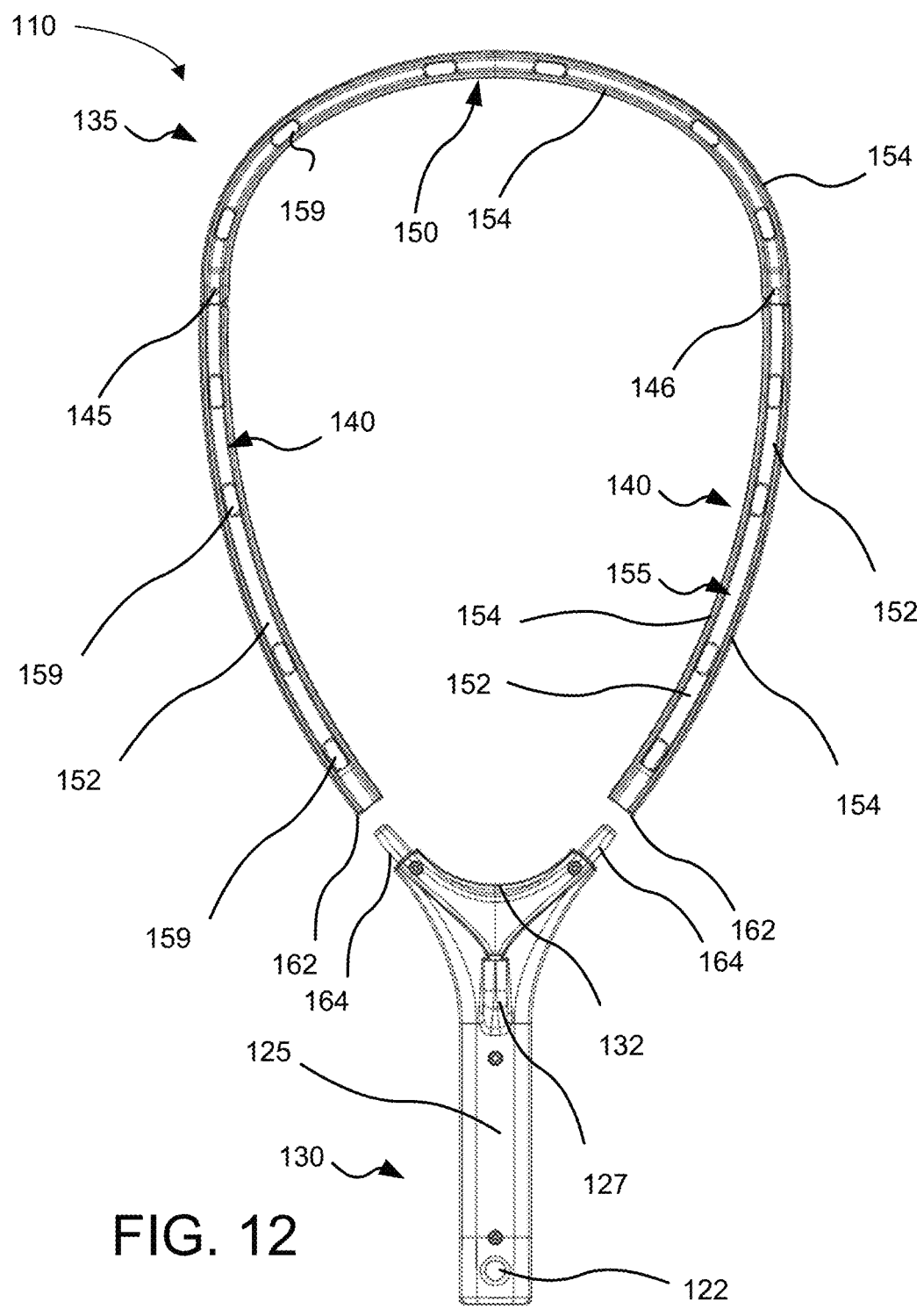
FIG. 12 depicts a front view of a frame in a disassembled state, according to one or more embodiments of the invention.

In the illustrated embodiment, the frame 110 includes two major parts, the handle 130 and the rim piece 135. These two pieces are depicted decoupled in FIG. 12 for clarity. In FIG. 12, the handle 130 is shown separated from the rim piece 135.

Referring back to FIG. 9, the handle 130 includes a grip portion 125. The grip portion 125 is generally just a grip where the user can grab the apparatus and manipulate the apparatus as needed. The handle 130 further includes some features. On the grip portion 125 of the handle 130, there is a recessed notch 127. The recessed notch is a recess in the handle that may be used to couple the net to the handle when the apparatus is fully assembled. This will be explained in more detail below.

The handle 130 further includes a throat 132. As can be seen, when the rim piece 135 is coupled to the handle 130, the rim piece 135 and the throat 132 of the handle 130 form a continuous loop. Such continuous loop allows for a sturdy and stable connection for the net. The continuous loop is shown as generally an oval shape in the illustrated embodiment. However, the continuous loop can be any shape rim that continues around and closes on itself. As examples, the continuous loop may form a circular shape, or perhaps a rectangular shape, or a trapezoidal shape. These are merely illustrative examples and the myriad of potential looped shapes are not delineated for the sake of brevity. The handle 130 further includes a through-hole 122. The through-hole 122 is a hole that extends all the way through the handle 130.

Referring now to the rim piece 135, the rim piece 135 includes three distinct pieces similar to those described in conjunction with previous Figures. The rim piece 135 includes two side pieces 140 and a cap piece 150. However, these component parts are coupled to each other at hinges. There is a first hinge 145 and a second hinge 146. To better see how these hinges operate, the rim piece 135 is shown in a collapsed position or folded position in FIG. 17. Referring back to FIG. 9, the rim piece 135 is shown in an expanded position or unfolded position or open position.

As can be seen, the rim piece 135 is a structural component that is relatively narrow that is configured to support the net. The net will attach or couple to the rim piece 135 and the rim piece 135 will give the flexible net shape and support to allow the net to be used to scoop up or hold fish (or potentially other objects).

It is important to note that the rim piece 135 of FIG. 9 has three pieces that can be folded. However, other configurations may only have a single hinge that folds the rim piece 135 in half. Or other embodiments may have more than two hinges and allow for further collapsing of the rim piece 135.

Figure 10:
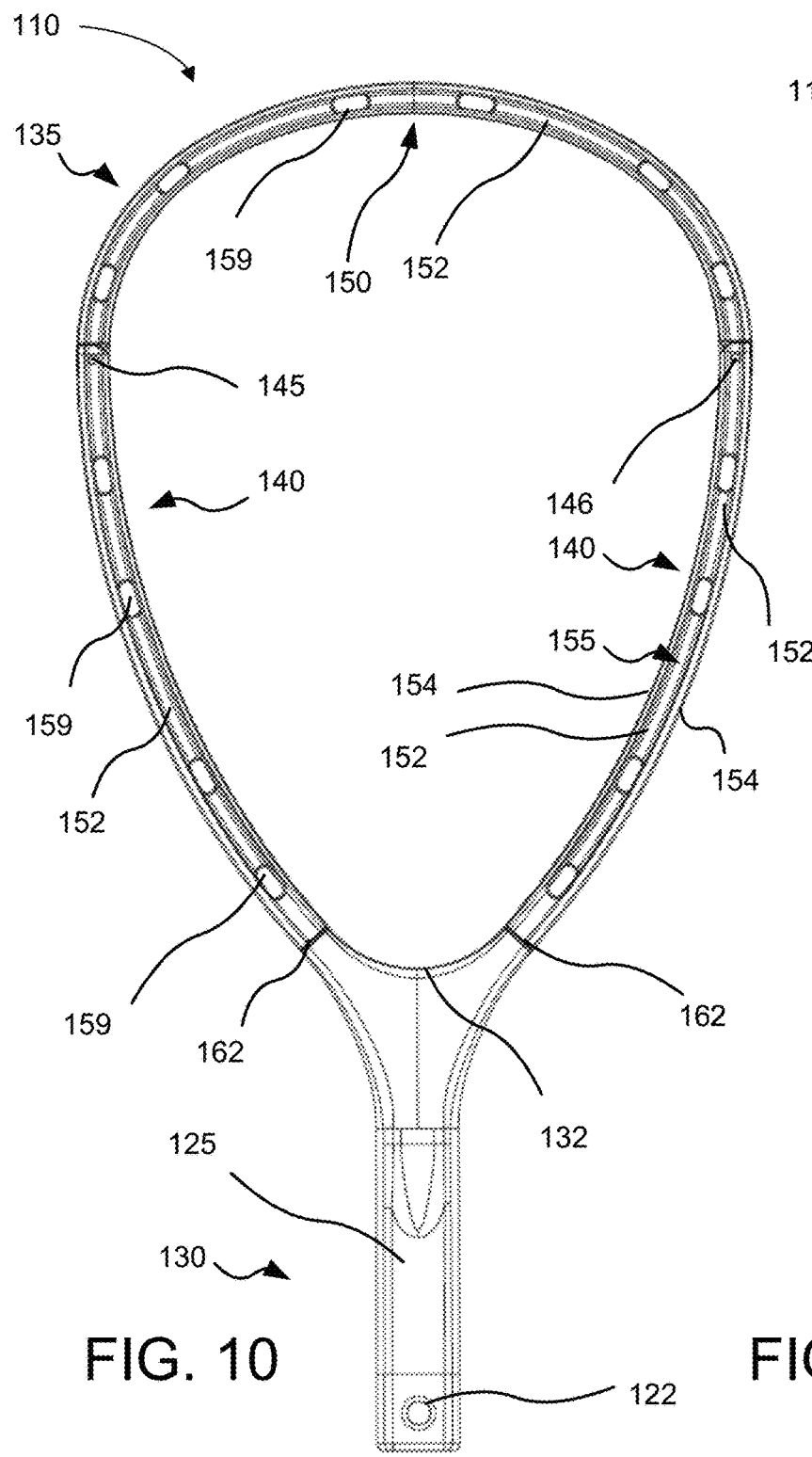
FIG. 10 depicts a rear view of the frame in an assembled or coupled state, according to one or more embodiments of the invention.

The rim piece 135 may be any of different shapes and configurations. In the illustrated embodiment, the rim piece 135 generally includes a cross-sectional shape that may be described as similar to an I-beam shape. The I-beam shape includes a web 152 between two flanges 154. The flanges 154 are raised up from the web 152. The raised flanges 154 create a channel that runs along the rim piece 135. Such a channel may be located on both sides of the rim piece 135. Only one side is depicted in FIG. 9, but the opposite side or rear side is shown in FIG. 10. The rim piece 135 in this embodiments is symmetrical with a channel on each side. Or to state it another way, the flanges 154 are raised from the central web 152 on both sides of the rim piece 135. This is why the general shape may be described as an I-beam.

Figure 8:
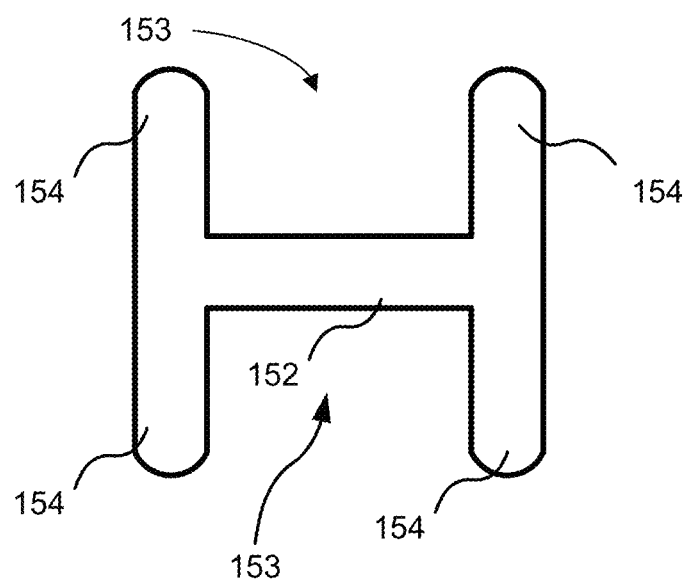
FIG. 8 depicts a cross-section view of a rim piece of a fly-fishing net apparatus, according to one or more embodiments of the invention.

Spaced periodically along the web 152 are various apertures 159. The apertures 159 are holes in the web 152. This allows for the net to be woven into the rim piece 135. In many embodiments, this is done by use of a cable. A cable sits in the channel and weaves from one side of the web of the I-beam shape to the other side of the web through the apertures 159. This weaving allows for the net to be secured to the rim piece 135. The cable can also sit within the channel with the flanges 154 protecting the cable within the channel from damage during normal use of the apparatus 100. Referring to FIG. 8, the general cross-section of the rim piece 135 is shown with the flanges 154 raised up from the web 152 and forming channels 153.

The rim piece 135 is configured to abut up to the handle 130 at the two ends 162 of the rim piece 135. The end 162 abuts and contacts or is seated on the handle 130. There may be male and female connections on the handle and on the rim piece that are configured to mate and couple together the two pieces generally. The male connector shown on the handle in some Figures may be on the rim piece in other embodiments.

Figure 11:
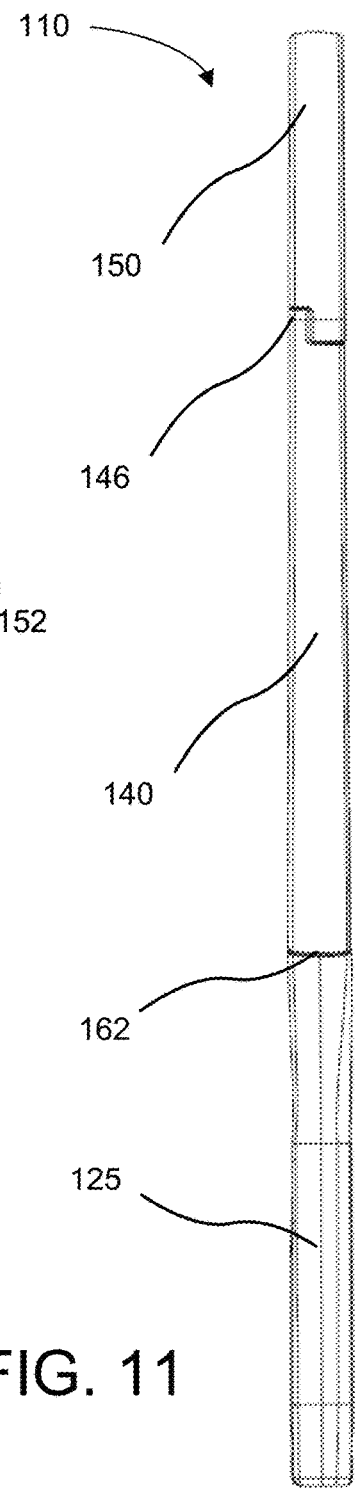
FIG. 11 depicts a side view of a frame in an assembled or coupled state, according to one or more embodiments of the invention.

FIG. 10 depicts an opposite side of the frame 110 from what is depicted in FIG. 9. As can be seen, almost all of the features shown in FIG. 9 are also shown on the opposite side. However, the recessed notch 127 is not present on the back side of the handle. FIG. 11 depicts a side view of the frame 110. The side view better shows the connection at the hinge 146 that separates the side piece 140 and the cap piece 150.

FIG. 12 depicts many of the same features as discussed in the previous Figures but shows the two components decoupled and separated. While separated, the handle 130 now shows two male connectors 164 that extend out from the handle near to and on each side of the throat 132.

Figure 13:
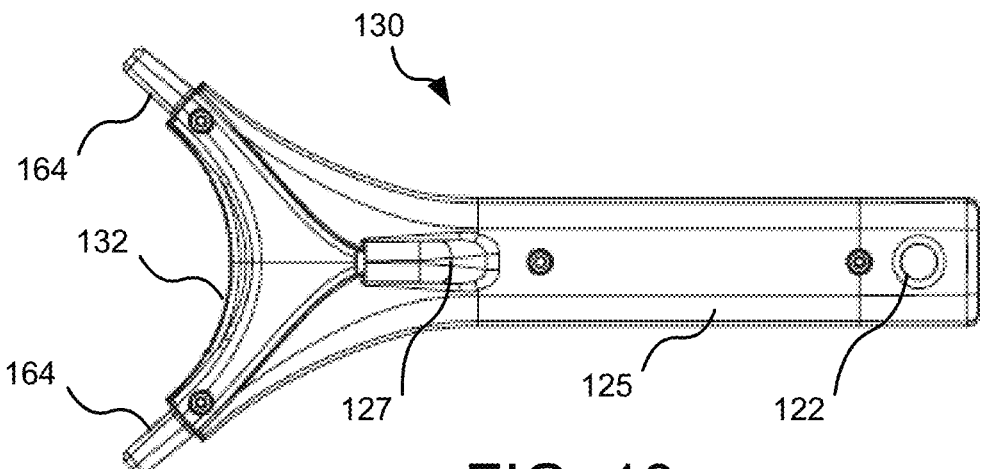
FIG. 13 depicts a front view of a handle, according to one or more embodiments of the invention.
Figure 14:
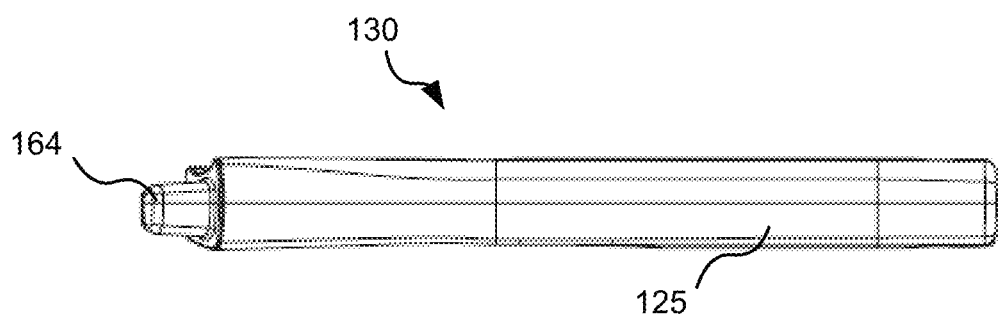
FIG. 14 depicts a side view of a handle, according to one or more embodiments of the invention.
Figure 15:
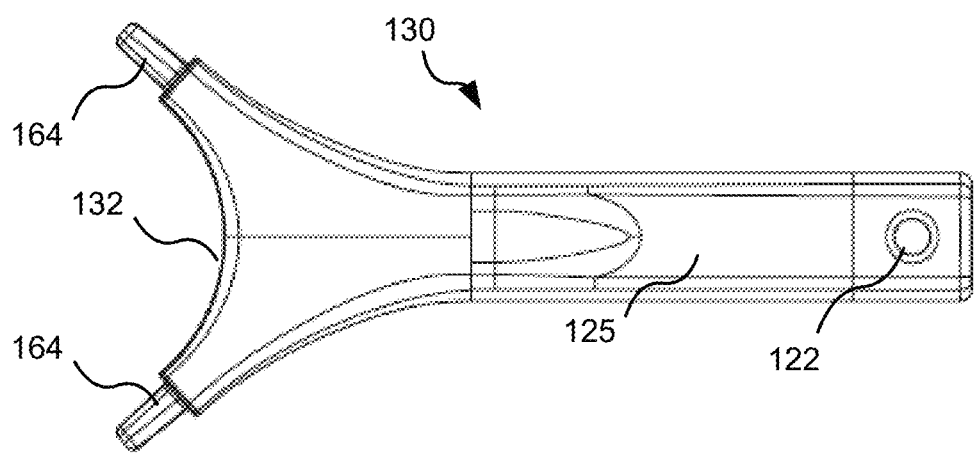
FIG. 15 depicts a rear view of a handle, according to one or more embodiments of the invention.

FIGS. 13, 14, and 15 depict the handle 133. FIG. 13 depicts a front view. FIG. 14 depicts a side view. FIG. 15 depicts a rear or backside view of the handle.

Figure 16:
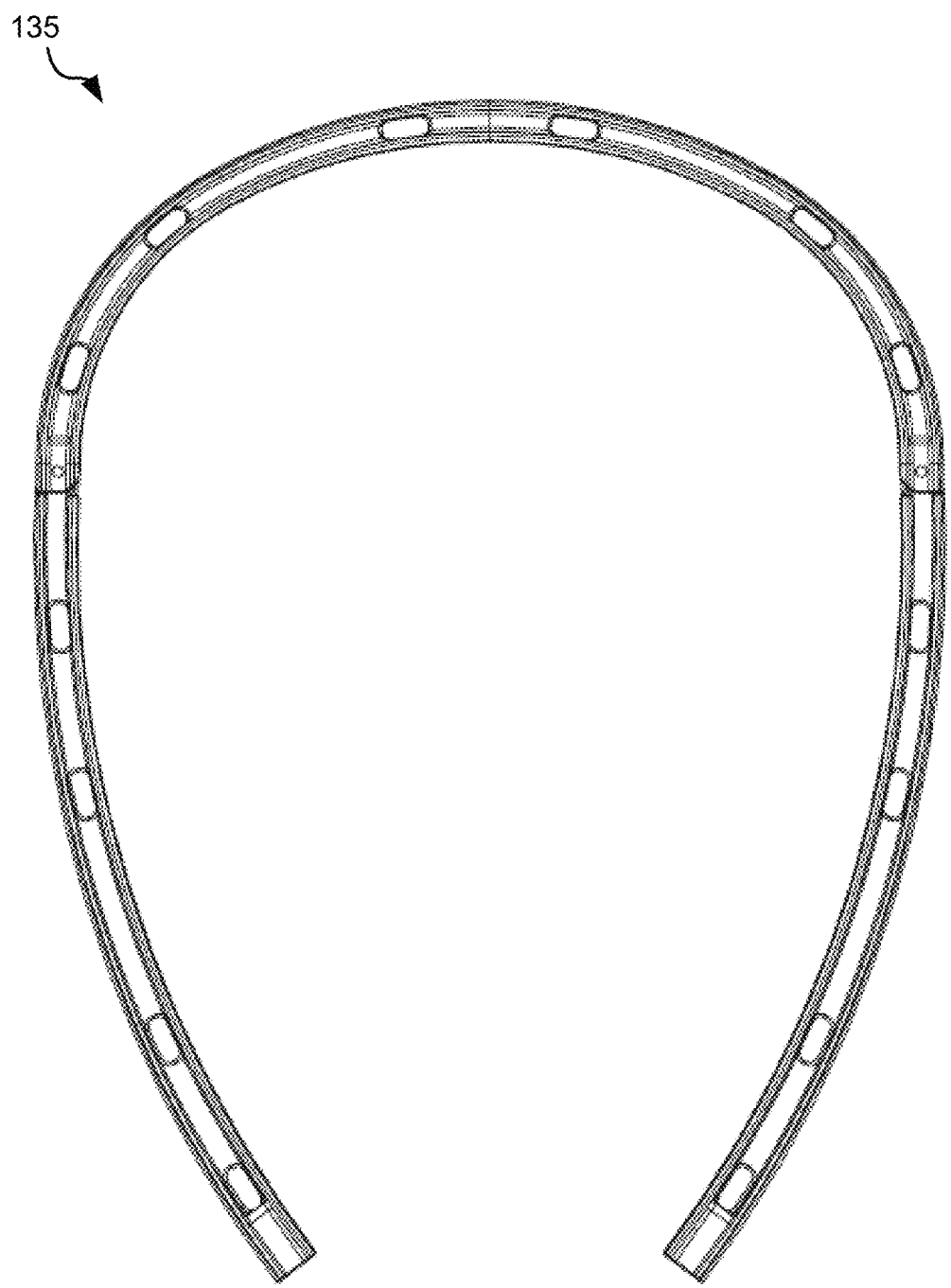
FIG. 16 depicts a front view of a rim piece in an expanded or unfolded configuration, according to one or more embodiments of the invention.

FIG. 16 depicts a front view of the rim piece 135. The rim piece 135 is shown detached or decoupled from the handle. The rim piece is shown in an expanded or unfolded configuration or state. The rim piece forms a generally horseshoe shape. As can be seen, the continuous loop that is formed in the apparatus is a majority formed by the rim piece. The throat of the handle forms a minority of the continuous loop.

Figure 17:
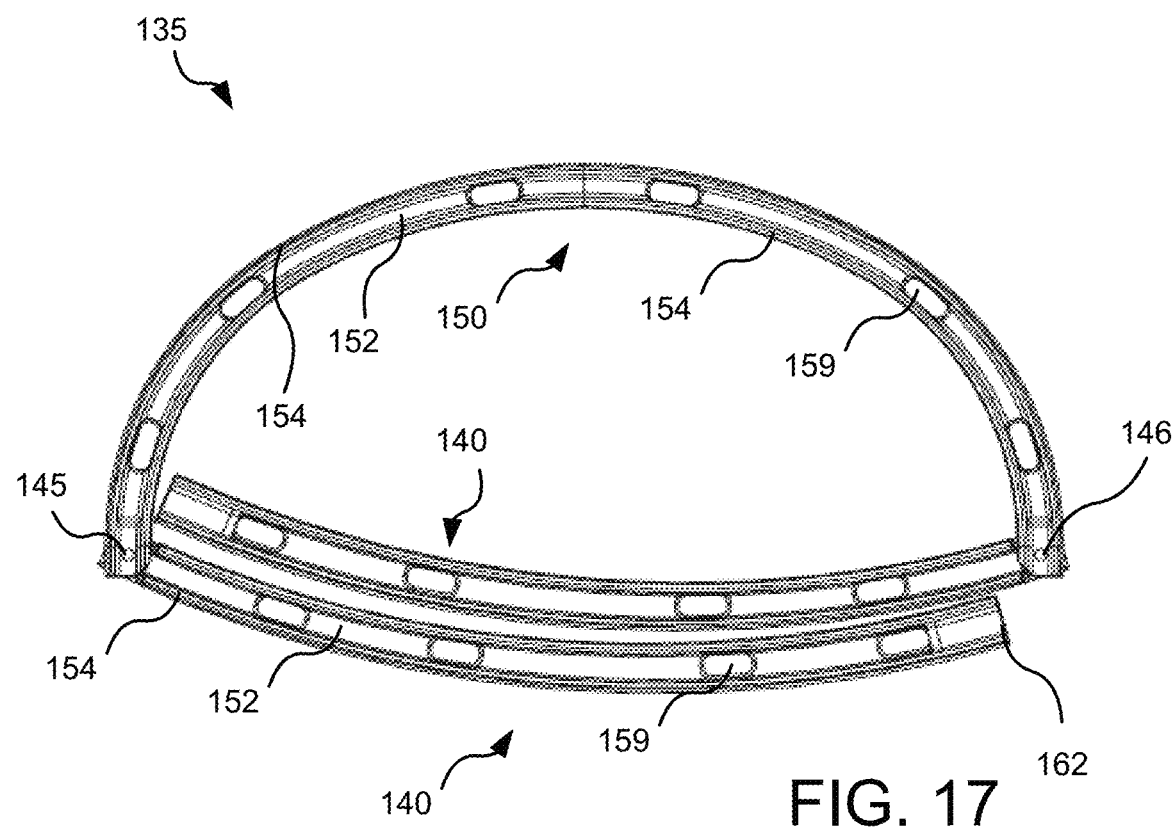
FIG. 17 depicts a front view of a rim piece in a collapsed or folded configuration, according to one or more embodiments of the invention.

FIG. 17 depicts a front view of the rim piece 135. The rim piece 135 is shown detached or decoupled from the handle 130. The rim piece 135 is shown in a collapsed or folded configuration or state. As can be seen, the side pieces 140 are folded in on the cap piece 150 at hinge 145 and hinge 146. The end 162 of each side piece is folded to be near or adjacent to an opposite hinge when in the folded state. This allows for the overall size of the apparatus to be decreased during transport or storage.

Figure 18:
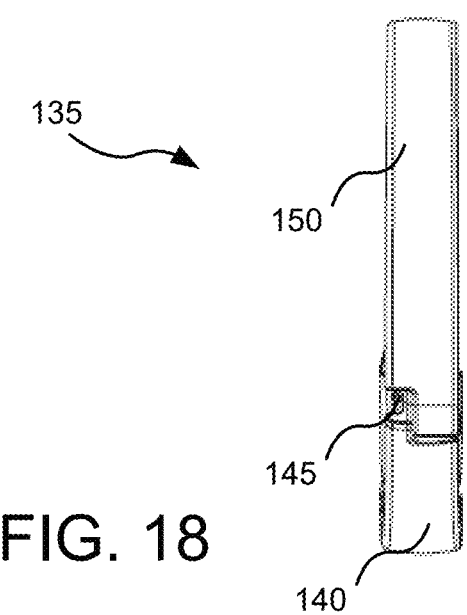
FIG. 18 depicts a side view of a rim piece in a collapsed or folded configuration, according to one or more embodiments of the invention.

Referring to FIG. 18, a side view of the rim piece 135 is shown in the folded or collapsed configuration. The side piece 140 is folded up and moved closer to the cap piece 150.

Figure 19:
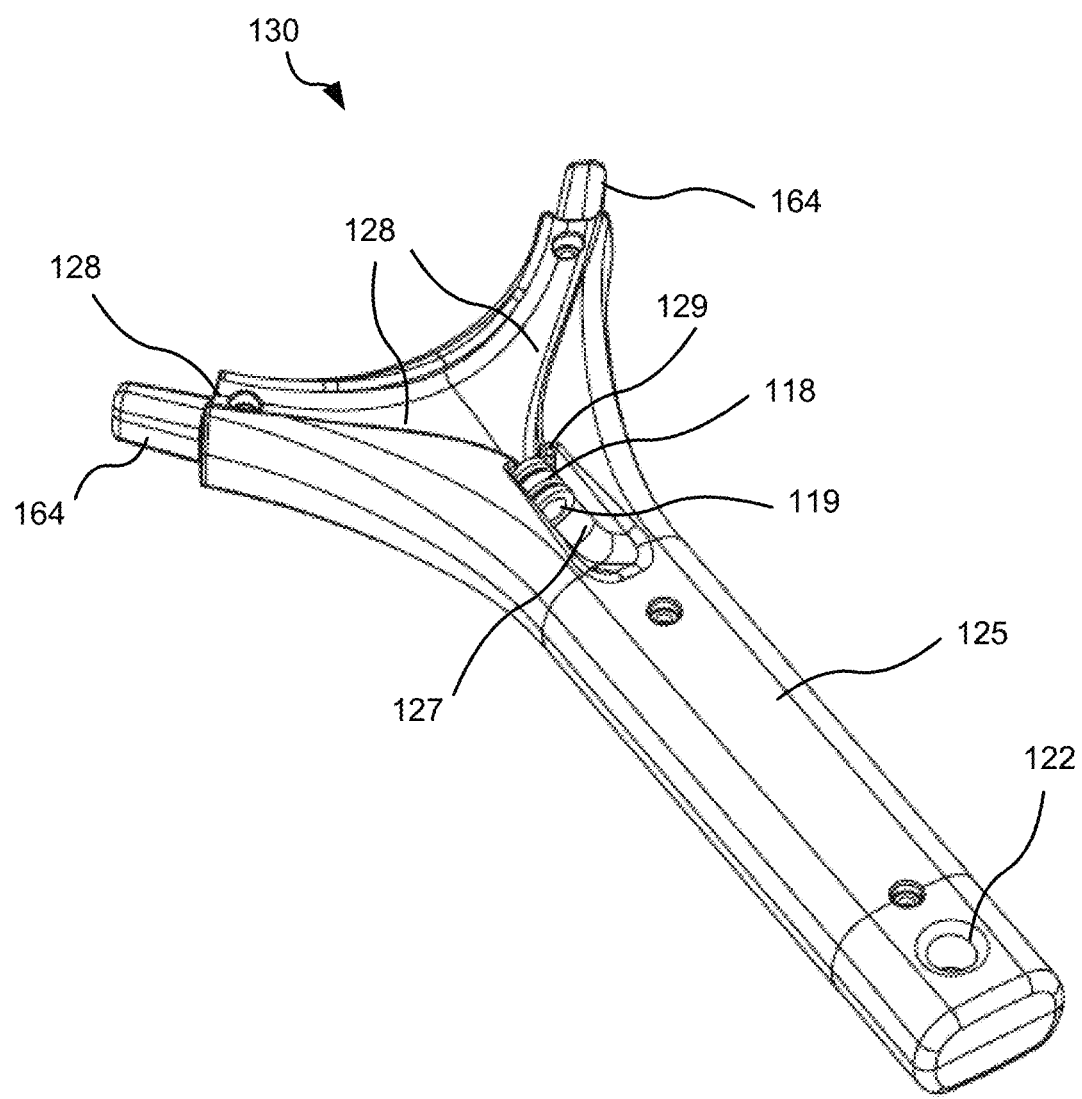
FIG. 19 depicts a perspective view of a handle, according to one or more embodiments of the invention.

Referring now to FIG. 19, a perspective view of the handle 130 is depicted. This perspective view better shows some of the components that were previously discussed in other Figures. Of note, in this Figure, is a recessed channel 128 that extends from where the male connectors 164 are located (along the throat 132) and down to the recessed notch 127. Another component is depicted in FIG. 19. As cylinder 118 is shown seated within the recessed notch 127. What is not depicted is a cable 320 (see FIGS. 22 and 23) that would run along the recessed channel 128 and be inserted through cylinder 118 such that the cable would come from both sides of the handle and extend through the cylinder 118 and out the end 119 of the cylinder 118. The cylinder 118 acts as a cinch on the cable and would keep the cable taut and in place. The cylinder 118 is fitted to snap into the recessed notch 127 and stay in place by interference of a lip 129 that holds the cylinder 118 in place.

Figure 20:
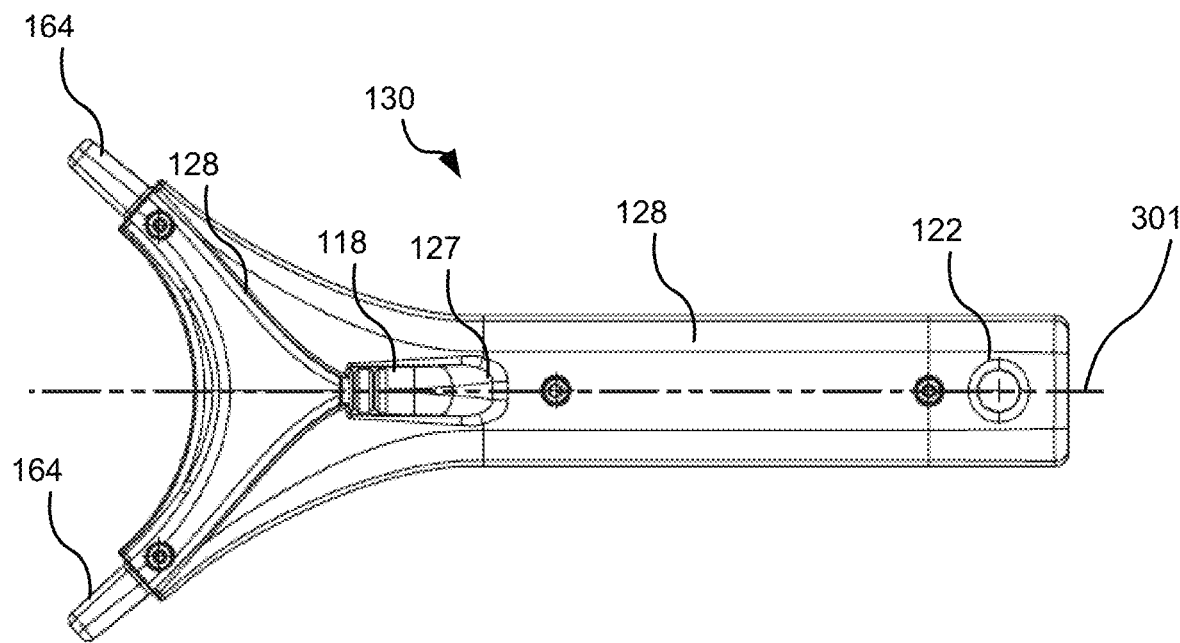
FIG. 20 depicts a front view of a handle, according to one or more embodiments of the invention.
Figure 21:
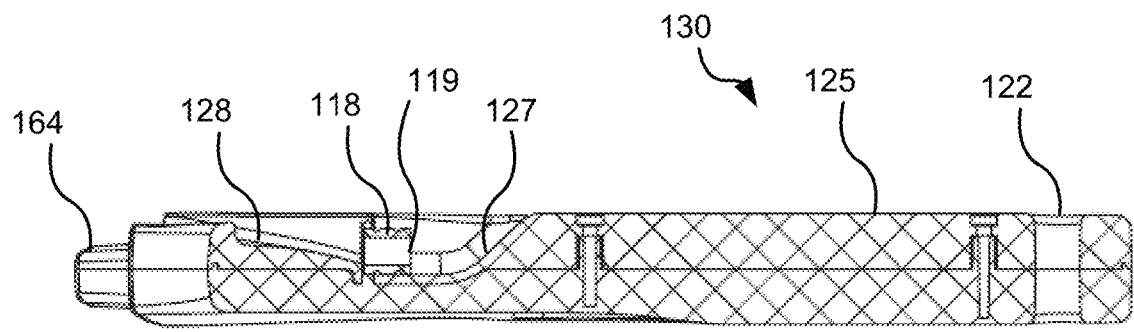
FIG. 21 depicts a cross-sectional side view of a handle, according to one or more embodiments of the invention.

Referring now to FIG. 20, the cylinder 118 is shown seated in the recessed notch 127 of the handle 130. FIG. 21 is a cross-sectional view of the handle along line 301 (shown in FIG. 20). The cross-sectional view allows for better understanding of the recessed channel 128, the cylinder 118 (also shown cross-sectionally cut), and the recessed notch. As can be seen, the notch is deeper than the channel. This allows for the cylinder to be seated in the notch and not slide out towards the recessed channel.

Figure 22:
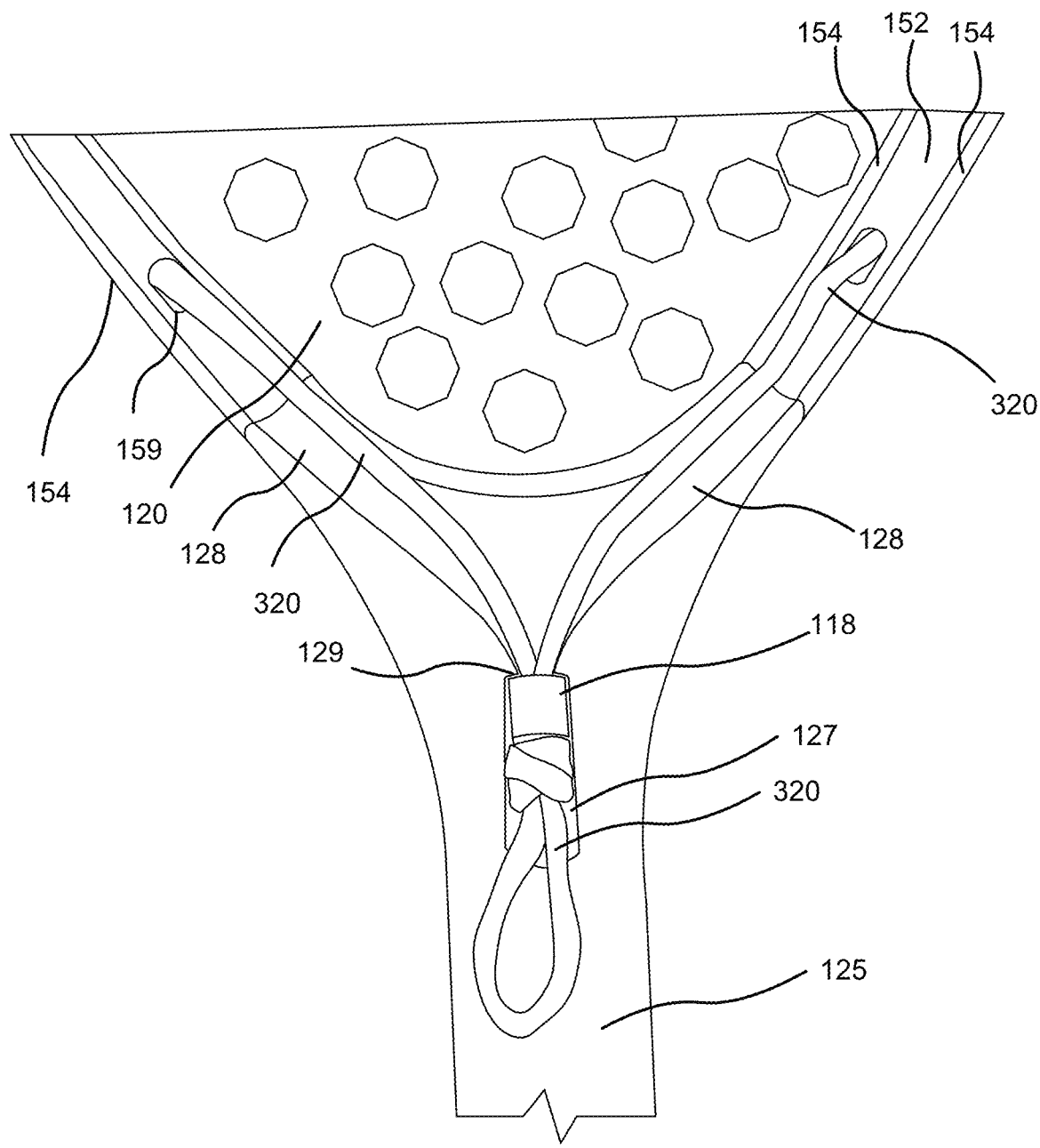
FIG. 22 depicts a close-up view of an apparatus in an assembled configuration, according to one or more embodiments of the invention.

Referring now to FIG. 22, the net and cable 320 are shown in place and coupled to both the rim piece 135 (via weaving from the apertures 159) and the handle 130 (via the recessed notch 127). The cylinder 118 cinches the cable 320 and keeps the cable 320 taut and coupled to the handle 130 making the apparatus 100 ready to use.

Figure 23:
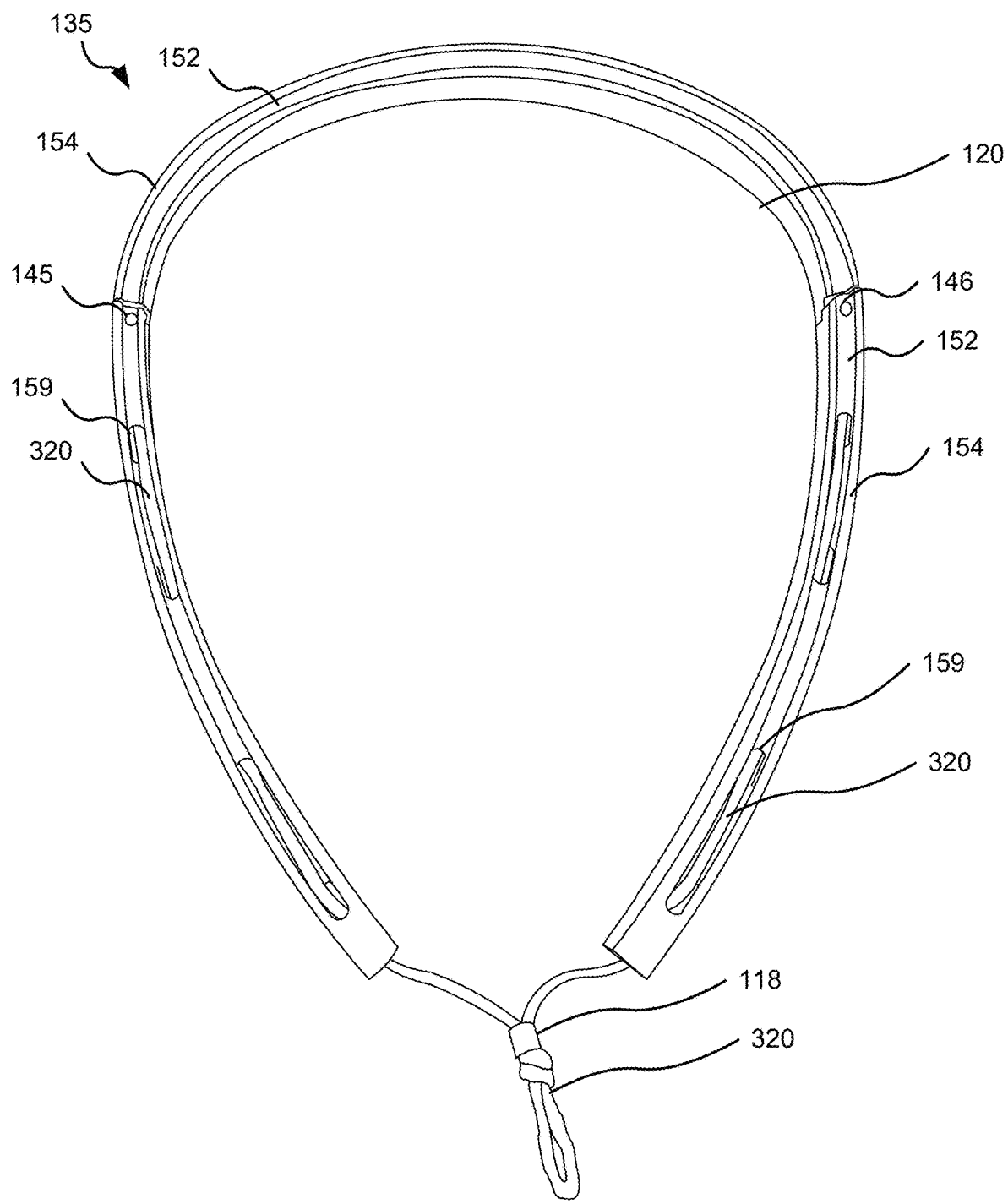
FIG. 23 depicts a front view of a net and rim piece, according to one or more embodiments of the invention.

Referring now to FIG. 23, the net 120 and the rim piece 135 are shown separate from the handle. As can be seen, the net 120 includes an actual mesh netting that is coupled to a cable 320. The cable 320 is woven along the channel of the rim piece 135 snaking through the apertures 159 to secure the net 120 to the rim piece 135. The cylinder 118 is also shown cinching the two ends of the cable together such that the cylinder can couple the cable to the handled and thus secure the net to both the handle and the rim piece.

These various embodiments shown herein are merely for illustrative purposes. Variations on the specific features discussed herein are contemplated within the scope of various embodiments of the invention.

A method of use of the apparatus is also contemplated herein. It includes the assembling of the various components together as well as the disassembling of the components into their component pieces.

The advantage of being able to quickly disassemble and quickly assemble the apparatus together allows for efficient use of space when the apparatus is not in use. This is especially important for user applications where equipment space is limited (such as on backpacking trips). Embodiments herein are disclosed to overcome the challenges present in current fishing nets and their limitations.

Although the operations of the method(s) or processes herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The present subject matter may be embodied in other specific forms without departing from its spirit or essential characteristics. The described embodiments are to be considered in all respects only as illustrative and not restrictive.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

What is claimed is:

1. A collapsible fishing net apparatus, the apparatus comprising:
    a handle comprising a grip and a throat and a pair of connectors positioned on each side of the throat,
    the handle further comprising a recessed notch on a first side of the handle, the recessed notch centered on the handle and positioned between the grip and the throat,
    and further comprising a recessed channel extending from the connectors to the recessed notch;
    a rim piece that is configured to couple and decouple from the handle at two points on the handle at the connectors of the handle,
    wherein when rim piece is coupled to the handle, the rim piece and throat of the handle together form a continuous loop,
    and wherein the rim piece comprises a cap piece and two side pieces, wherein the rim piece is connected at each end to the side pieces at a hinge that allows the side pieces to be folded towards the cap piece,
    and wherein the rim piece comprises a web and flanges, wherein the web and flanges form a channel, the channel positioned between the flanges, and wherein the rim piece comprises a plurality of periodically spaced apertures located on the web,
    and wherein the channel of the rim piece aligns with the recessed channel of the handle when the rim piece is coupled to the handle; and
    a net that is configured to couple to both the handle and the rim piece and enclose the continuous loop, wherein the net comprises a cable, wherein the cable is looped through the apertures and is secured into the notch of the handle.

2. The collapsible fishing net apparatus of claim 1, wherein the continuous loop forms an oval shape when the rim piece is in an expanded configuration and coupled to the handle.

3. The collapsible fishing net apparatus of claim 2, wherein the rim piece comprises connectors at each end of the rim piece, wherein the connectors are configured to couple to the handle.

4. The collapsible fishing net apparatus of claim 3, wherein the connectors of the rim piece are female connectors.

5. The collapsible fishing net apparatus of claim 4, wherein the connectors of the handle comprises male connectors, and wherein the male connectors couple to the female connectors of the rim piece.

6. The collapsible fishing net apparatus of claim 1, wherein the cable is configured to couple to the handle at the notch.

7. The collapsible fishing net apparatus of claim 1, wherein the rim piece comprises three decouplable parts, a first rim piece, a second rim piece, and a cap piece.

8. The collapsible fishing net apparatus of claim 7, wherein first rim piece and the second rim piece are configured to couple to the handle, and wherein the cap piece is configured to couple to the first rim piece and the second rim piece.

9. A collapsible fishing net apparatus, the apparatus comprising:
    a handle comprising a grip and a throat and a pair of connectors positioned on each side of the throat,
    the handle further comprising a recessed notch on a first side of the handle, the recessed notch centered on the handle and positioned between the grip and the throat,
    and further comprising a recessed channel extending from the connectors to the recessed notch;
    a rim piece coupled to the handle, and wherein the rim piece is configured to completely decouple from the handle to form two separate pieces of the apparatus, and wherein when rim piece is coupled to the handle, the rim piece and handle together form a continuous loop,
    and wherein the rim piece comprises a cap piece and two side pieces, wherein the rim piece is connected at each end to the side pieces at a hinge that allows the side pieces to be folded towards the cap piece,
    and wherein the rim piece comprises a web and flanges, wherein the web and flanges form a channel, the channel positioned between the flanges, and wherein the rim piece comprises a plurality of periodically spaced apertures located on the web,
    and wherein the channel of the rim piece aligns with the recessed channel of the handle when the rim piece is coupled to the handle; and
    a net that is configured to couple to both the handle and the rim piece and enclose the continuous loop, wherein the net comprises a cable, wherein the cable is looped through the apertures and is secured into the notch of the handle.

10. The collapsible fishing net apparatus of claim 9, wherein the rim piece comprises a first hinge and a second hinge that can be folded when the rim piece is decoupled from the handle.

11. The collapsible fishing net apparatus of claim 10, wherein the rim piece comprises connectors at each end of the rim piece, wherein the connectors of the rim piece are configured to couple to the handle.

* * * * *